(12) United States Patent
Park et al.

(10) Patent No.: US 9,172,823 B2
(45) Date of Patent: Oct. 27, 2015

(54) ALARM OPERATION METHOD AND MOBILE TERMINAL SUPPORTING THE SAME

(71) Applicant: Samsung Electronics Co., Ltd., Gyeonggi-do (KR)

(72) Inventors: Kwangweon Park, Gyeonggi-do (KR); Yongjoon Jeon, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/066,103

(22) Filed: Oct. 29, 2013

(65) Prior Publication Data

US 2014/0120896 A1 May 1, 2014

(30) Foreign Application Priority Data

Oct. 29, 2012 (KR) ........................ 10-2012-0120169

(51) Int. Cl.
*H04M 3/00* (2006.01)
*H04M 19/04* (2006.01)
*H04M 1/725* (2006.01)

(52) U.S. Cl.
CPC .......... *H04M 19/04* (2013.01); *H04M 1/72558* (2013.01); *H04M 1/72566* (2013.01)

(58) Field of Classification Search
None
See application file for complete search history.

(56) References Cited

U.S. PATENT DOCUMENTS

| | | | |
|---|---|---|---|
| 7,333,396 B1 * | 2/2008 | Treyz et al. | 368/10 |
| 2002/0186618 A1 * | 12/2002 | Kirkpatrick | 368/11 |
| 2005/0107075 A1 | 5/2005 | Snyder | |
| 2007/0281750 A1 | 12/2007 | Cox et al. | |
| 2007/0297292 A1 * | 12/2007 | Kraft et al. | 368/73 |
| 2010/0177598 A1 * | 7/2010 | Zhang et al. | 368/10 |
| 2012/0124162 A1 * | 5/2012 | Cassidy | 709/217 |
| 2012/0257878 A1 | 10/2012 | Fujimura | |

FOREIGN PATENT DOCUMENTS

| | | |
|---|---|---|
| JP | 2006-165855 A | 6/2006 |
| JP | 2007-318667 A | 12/2007 |
| JP | 4114699 B2 | 7/2008 |
| JP | 2011-135534 A | 7/2011 |
| KR | 10-0813058 B1 | 3/2008 |

* cited by examiner

*Primary Examiner* — Erika A Washington
(74) *Attorney, Agent, or Firm* — Cha & Reiter, LLC

(57) ABSTRACT

An alarm operation system for use by a mobile terminal receives input data used for setting an alarm. The system sets alarm content comprising a category of multiple items of content including at least one of, (a) audio data and (b) video data, to be played in response to detection of an alarm trigger condition. The system selects an alarm content item for playback from the category in response to the detection of the alarm trigger condition.

11 Claims, 7 Drawing Sheets

ALARM OPERATION METHOD AND MOBILE TERMINAL SUPPORTING THE SAME

CLAIM OF PRIORITY

This application claims the benefit under 35 U.S.C. §119(a) of a Korean patent application filed on Oct. 29, 2012 in the Korean Intellectual Property Office and assigned Serial No. 10-2012-0120169, the entire disclosure of which is hereby incorporated by reference.

BACKGROUND

Technical Field

The present disclosure concerns alarm operation in a mobile terminal enabling adaptive setting of alert generation (an alarm) in response to different types of data content and enabling play back of data content in response to alarm activation.

Mobile terminals supporting communication with advanced hardware and software functions are common and typically provide an alarm function. That is, a user may set an alarm for a specific time triggering a preset sound intermittently or periodically. In known systems, typically settings of an alarm do not change once set unless a user explicitly changes the settings. Hence, the alarm may repeatedly play the same ringtone or music file without change. In order to change a ringtone or music file associated with an alarm, a user needs to select a desired ringtone or music file from multiple ringtones or music files stored in a mobile terminal through a setting menu. The selection of desired alarm content in known system is burdensome requiring multiple navigation steps and requires a user repeats entry of alarm settings. A system according to invention principles addresses these deficiencies and related problems.

SUMMARY

A system according to invention principles provides alarm operation enabling a category of alarm content to be readily assigned in response to content type and when an alarm is set, adaptively plays back alarm sound content when the alarm is triggered.

An alarm operation system for use by a mobile terminal receives input data used for setting an alarm. The system sets alarm content comprising a category of multiple items of content including at least one of, (a) audio data and (b) video data, to be played in response to detection of an alarm trigger condition. The system selects an alarm content item for playback from the category in response to the detection of the alarm trigger condition such as occurrence of a particular date and/or time or a signal derived by occurrence of one or more events.

In a feature of the invention, the system sets alarm content by entering a name of the category and selects, after the alarm is triggered, new content different than the previously played alarm content from the category as alarm content to be played next. The system sets alarm content by determining whether content belonging to the category is present in a storage unit of the mobile terminal and sets, when content belonging to the category is present in the storage unit, one item of content in the category as alarm content to be played in response to the alarm being triggered.

In another feature, the system sets alarm content by examining, when content belonging to the category is not present in the storage unit; establishing communication with an alarm content server providing content in response to a determination a network is available; and receives multiple items of content belonging to the category from the alarm content server. The system also selects one item of content from a plurality of content items stored in the storage unit as default alarm content to be played when the alarm is triggered in response to a determination a network is available. The system also examines, when content belonging to the category is absent from the storage unit; establishes communication with an alarm content server providing content in response to a determination a network is available; and selects content items having a highest ranking according to predetermined selection criteria from a plurality of content items that belong to the category and have associated rankings and provided by the alarm content server and stores the content items as alarm content for use in generating an alarm.

In a further feature an alarm operation method for use by a mobile terminal, examines alarm setting information in response to the detection of an alarm trigger time; selects one item of content as alarm content from multiple items of content belonging to a category of a plurality of items of content where the category is set for use in generating an alarm. The alarm content comprises at least one of, (a) audio data and (b) video data, to be played in response to detection of an alarm trigger condition; and the method plays the selected alarm content item in response to the detection of the alarm trigger time. The method executes a separate application to play the alarm content item and outputs audio and video data produced from application execution.

In another feature, the method selects one item of content as alarm content by selecting one item of content at random from a plurality of items of content belonging to the category; selects a new item of content not yet played as alarm content from the plurality of items of content belonging to the category; and selects an item of content with the highest ranking according to predetermined selection criteria from a plurality of items of content belonging to the category after examining ranking information associated with the category. The method establishes communication with an alarm content server through a communication unit; and acquires ranking information for multiple items of content belonging to the category from the alarm content server. The method also determines whether content belonging to the category is present in a storage unit of the mobile terminal, and if present, selects one item of content in the category as alarm content to be played in response to the alarm being triggered. Network availability is examined in response to a determination content belonging to the category is absent from the storage unit, communication is established via the network with an alarm content server in response the network being available and one item of content is acquired from among a plurality of items of content belonging to the category stored in the alarm content server. In response to the network being unavailable, the method selects one item of content as default alarm content from content stored in the storage unit. After the alarm is triggered, the method selects new content different than previously played alarm content from the category as alarm content to be played next.

In yet another feature a mobile terminal supports alarm operation using at least one of a display unit and an audio processing unit to output alarm content played when an alarm is triggered and a control unit. The control unit, determines whether desired alarm generation content is present in a storage unit, in response to the determination the desired alarm generation content is present, selects the content as alarm content to be played when an alarm is triggered, in response to the determination the desired alarm generation content is absent from the storage unit, determines network operational availability, establishes via the network, communication with an alarm content server providing content, in response to the determined network operational availability, acquires desired alarm generation content from the alarm content server and in response to a determination the network is not operationally available, selects one item of content as default alarm content from content stored in the storage unit.

In a further feature, the control unit acquires ranking information for multiple items of content belonging to the category, selects an item of content with the highest ranking according to predetermined item selection criteria from the category, and plays the selected item of content as alarm content. When the alarm is successively and repetitively generated, the control unit plays a different item of content selected from the category as alarm content in response to the alarm being triggered. The control unit in another embodiment, examines input information selecting alarm content, in response to alarm content being selected, employs content indicated by the input information and present in a storage unit as alarm content to be played in response to triggering of an alarm, in response to alarm content being selected and being absent from the storage unit, determines operational availability of a communication network, in response to determined operational availability of a network, establishes communication via the network with an alarm content server providing content, acquires the indicated content as alarm content from the alarm content server, and in response to a determination the network is not operationally available, selects one item of content from content stored in the storage unit as default alarm content to be played when the alarm is triggered. The alarm content is an item of content selected at random, according to an order, or according to ranking information from among multiple items of content belonging to a category determined in response to an input event.

BRIEF DESCRIPTION OF THE DRAWINGS

The features and advantages of the present invention will be more apparent from the following detailed description in conjunction with the accompanying drawings, in which.

DETAILED DESCRIPTION

Figure 1:
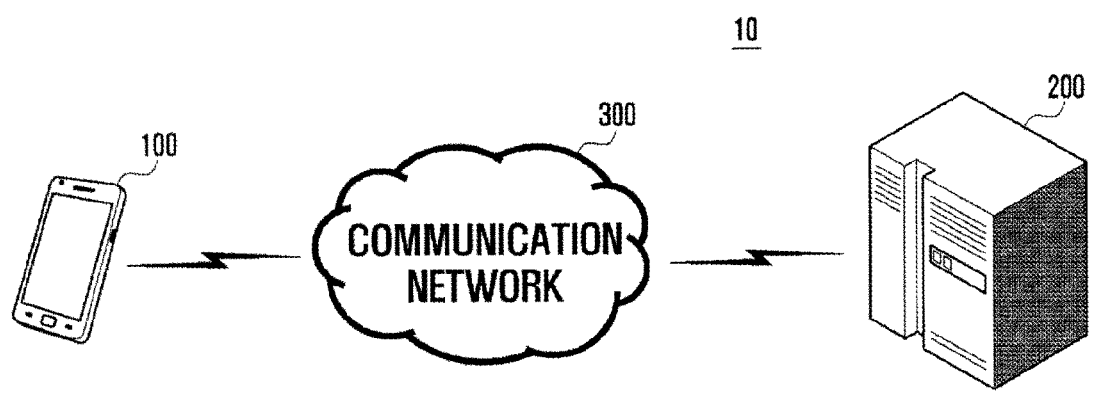
FIG. 1 shows an alarm operation system according to invention principles.

Hereinafter, exemplary embodiments of the present invention are described in detail with reference to the accompanying drawings. For the purposes of clarity and simplicity, detailed descriptions of well-known functions and structures incorporated herein may be omitted to avoid obscuring the subject matter of the present invention. Detailed descriptions of components having substantially the same configurations and functions may also be omitted. In the drawings, some elements are exaggerated or only outlined in brief, and thus may be not drawn to scale. The present invention is not limited by relative sizes of objects and intervals between objects in the drawings.

FIG. 1 shows an alarm operation system 10 including an alarm content server apparatus 200 and a mobile terminal 100, and communication network 300 supporting signal exchange between system components. The alarm operation system 10 enables the mobile terminal 100 to set multiple pieces of content belonging to a content category as alarm content for an alarm. System 10 permits the mobile terminal 100 to utilize specific content as a ringtone for an alarm and also to utilize a group of pieces of content as ringtones for an alarm. Hence, the user may listen to different alarm sounds when the same alarm is repeatedly triggered.

Alarm content server apparatus 200 provides alarm content to the mobile terminal 100 through the communication network 300. In particular, the alarm operation system 10 enables a user to employ content pre-stored in the mobile terminal 100 and also different content stored in the alarm content server apparatus 200 as a ringtone for an alarm. In response to mobile terminal 100 experiencing difficulty in receiving alarm content due to bad network conditions, the alarm operation system 10 directs the mobile terminal 100 to play pre-stored default alarm content, enabling adaptive and flexible alarm operation. In the alarm operation system 10, when execution of a separate application (or app) is needed to play alarm content, the mobile terminal 100 directly executes the needed application. Hence, a variety of content may be used as a ringtone for an alarm.

The alarm content server apparatus 200 provides the mobile terminal 100 with a specific alarm content item or a group of items of alarm content of a given category for alarm operation of the mobile terminal 100. In response to connecting with the mobile terminal 100 through the communication network 300, the alarm content server apparatus 200 enables the mobile terminal 100 to select alarm content or a category of alarm content to be used for alarm operation and provides the mobile terminal 100 with a screen for selecting specific alarm content or a category of alarm content for alarm setting. Server apparatus 200 provides content set by the mobile terminal 100.

The alarm content server apparatus 200 provides the mobile terminal 100 in an alarm setting operation, with at least one of an alarm content item and a group of alarm content items of one category in response to user selection or terminal selection. The alarm content server apparatus 200 provides the mobile terminal 100 with content comprising audio information like a ringtone and also moving-image content having video and audio information as alarm content. The alarm content server apparatus 200 also provides the mobile terminal 100 with different types of alarm content including, game content, broadcast content and educational content. In response to the mobile terminal 100 requesting a group of items of alarm content related to a genre or artist as a category, the alarm content server apparatus 200 provides multiple pieces of alarm content as requested to the mobile terminal 100 in alarm setting operation, and provides one piece of alarm content selected randomly or according to a condition from the requested group of alarm content to the mobile terminal 100 in alarm triggering operation. The alarm content server apparatus 200 maintains a record of alarm content provided to a mobile terminal 100 and in response to the record, the alarm content server apparatus 200 provides new alarm content of a particular category of alarm content to the mobile terminal 100 in response to an alarm being triggered, minimizing repeated playback of the same alarm content.

The communication network 300 establishes a communication channel between the mobile terminal 100 and the alarm content server apparatus 200 and supports data transmission therebetween. For example, the communication network 300 permits the mobile terminal 100 to connect to the alarm content server apparatus 200, deliver screen data for alarm content selection provided by the alarm content server apparatus 200 to the mobile terminal 100, and deliver alarm content selected by the mobile terminal 100 from the alarm content server apparatus 200 to the mobile terminal 100. The communication network 300 may be a 3G or 4G communication network or other data communication network compatible with features of the mobile terminal 100. The communication network 300 provides the mobile terminal 100 with information regarding the wireless environment between the alarm content server apparatus 200 and the mobile terminal 100 comprising state information related to channel establishment with the alarm content server apparatus 200 through a networking entity to which the mobile terminal 100 is attached. The networking entity comprises a serving base station, which provides wireless environment state information (referred to as network state information) for a specific communication service to the mobile terminal 100. The state information (for example, good or bad indications for communication) for the wireless environment may be related to the strength of a signal received by the mobile terminal 100. In response to the mobile terminal 100 issuing an attachment request, the communication network 300 provides network state information to the mobile terminal 100.

The mobile terminal 100 receives a user request for setting or triggering alarm content and handles the user request adaptively according to context of the mobile terminal 100. For example, when alarm content indicated by an alarm setting request is stored in a storage unit, the mobile terminal 100 sets the alarm content stored in the storage unit as a ringtone to be played when the corresponding alarm is triggered. The mobile terminal 100 configures settings so that specific alarm content stored in the storage unit is played when the alarm time arrives.

When alarm content indicated by the alarm setting request is not stored in the storage unit, the mobile terminal 100 connects to the alarm content server apparatus 200 and receives the indicated alarm content from the alarm content server apparatus 200. In response to a single piece of alarm content being indicated by the alarm setting request, the mobile terminal 100 receives the indicated alarm content; and when a category of alarm content is indicated, the mobile terminal 100 receives multiple alarm content items of the indicated category or receives at least one piece of alarm content selected from the category at random or in response to a record of received alarm content. Received alarm content is stored in a storage unit and used when the alarm function is executed.

When the network state is not acceptable (for example, received signal strength is below a preset threshold or a data transfer rate is lower than a threshold value), the mobile terminal 100 sets randomly selected alarm content from the storage unit as a ringtone for an alarm regardless of details of the alarm setting request. When execution of a separate application other than the alarm application is needed for alarm content playback, the mobile terminal 100 initiates the application for execution in advance or at the alarm triggering time.

If desired alarm content is not present in the mobile terminal 100, the alarm operation system 10 enables the user to receive such alarm content from the server apparatus and utilize the received alarm content for alarm setting and triggering. Thereby, the alarm operation system 10 enables the user to readily select different alarm content and to hear new sound whenever the alarm is triggered.

Figure 2:
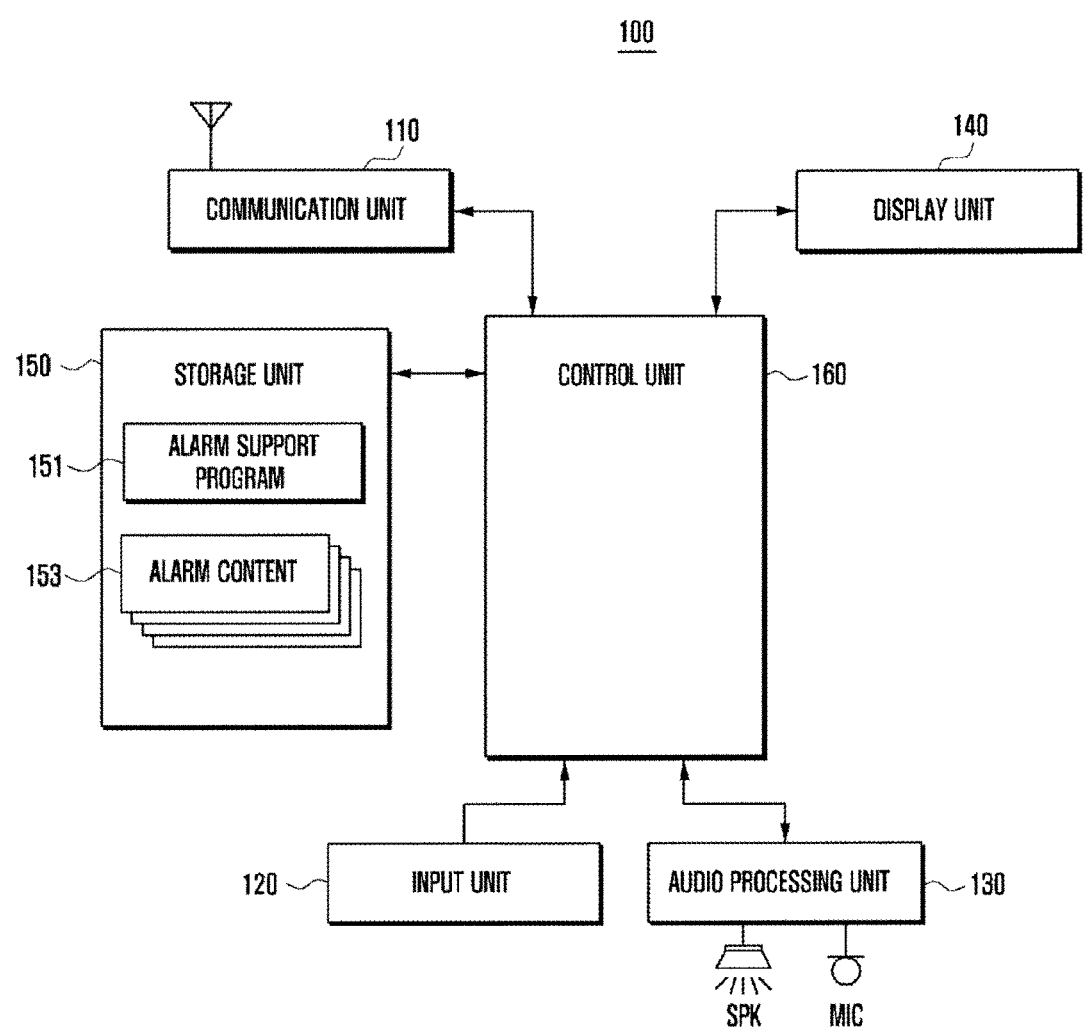
FIG. 2 shows a block diagram of the mobile terminal shown in FIG. 1 according to invention principles.

FIG. 2 shows a block diagram of the mobile terminal 100 supporting different methods for alarm content setting and playback and including a communication unit 110, an input unit 120, an audio processing unit 130, a display unit 140, a storage unit 150, and a control unit 160. The mobile terminal 100 uses alarm content 153 pre-stored in the storage unit 150 for alarm setting or triggering operation. In response to alarm content indicated by user input through the input unit 120 being absent from storage unit 150, the mobile terminal 100 operate employs communication unit 110 to receive the indicated alarm content from the alarm content server apparatus 200. Terminal 100 supports alarm content selection by category and executes a separate application to play selected alarm content.

Communication unit 110 is connected to the communication network 300 to establish a communication channel to the alarm content server apparatus 200. Communication unit 110 acquires network state information from the communication network 300 and forwards the network state information to the control unit 160. In response to unit 160 determining the network state is acceptable, the communication unit 110 establishes a communication channel to the alarm content server apparatus 200 and receives alarm content from unit 200 under control of the control unit 160. The received alarm content is temporarily or semi-permanently stored in the storage unit 150 or is played without storage in alarm triggering operation under control of the control unit 160. When the network state is not acceptable, the communication unit 110 terminates access to the alarm content server apparatus 200 and enters a deactivated state under control of the control unit 160.

The input unit 120 is configured to provide various input signals supporting operation of the mobile terminal 100 and comprises a keyboard, keypad and key button and touch screen using a key map output on a display panel and may also use a touch pen, for example. Input unit 120 supports button keys and a virtual key map for alarm setting operation and provides an input signal for, selecting an alarm application, entering an alarm time, selecting alarm content or specifying a category of alarm content and alarm reset in response to a user command input signals sent to control unit 160. Unit 120 provides an input signal for terminating an activated alarm and unit 120 supports reassigning a side key or home key to comprise an alarm termination key or unit 120 supports output of a virtual button key for alarm termination on the display unit 140.

The audio processing unit 130 acquires and outputs different types of audio data generated in the course of using the mobile terminal 100, output audio data generated by playback of audio files stored in the storage unit 150, and output audio data received externally, for example. Audio processing unit 130 includes a speaker SPK and a microphone MIC and outputs different types of audio data related to alarm operation. For example, the audio processing unit 130 may output a sound effect or sound notification for alarm setting operation. In response to a category of alarm content being specified during alarm setting operation, the audio processing unit 130 outputs a sound notification associated with the category. Thereafter, the audio processing unit 130 outputs audio data by playing alarm content randomly selected from the category. When a moving image is used as alarm content, the audio processing unit 130 outputs audio data when the moving image alarm content is played back. When an alarm is triggered, even in silent mode, the audio processing unit 130 outputs audio data by playing alarm content set or selected from a category of alarm content specified when the alarm is set. Output of a sound effect or sound notification may be skipped in response to user settings.

The display unit 140 presents various screen images related to operation of the mobile terminal 100. For example, the display unit 140 outputs an idle content screen image, a menu content screen image, a memo writing screen image, an email composition screen image, and a webpage content screen image in the course of operating the mobile terminal 100. In one embodiment, the display unit 140 includes a touch panel and a display panel that are stacked to form a touch screen.

The display unit 140 outputs various screen images for alarm operation including, an alarm setting screen image and an alarm triggering screen image. The alarm setting screen image includes an alarm time region and an alarm content region, and the alarm content region supports setting of at least one portion of alarm content of a particular single category. The alarm triggering screen includes a screen notifying arrival of the alarm time set in advance and a playback screen for playing the alarm content set through the alarm setting screen.

The storage unit 150 stores an operating system for operation of the mobile terminal 100 and stores data, application programs and algorithms supporting user functions. The storage unit 150 includes an alarm support program 151 and alarm content 153 support alarm operation. The alarm support program 151 includes an alarm setting module and an alarm triggering module. The alarm setting module provides different methods supporting alarm setting operation. For example, the alarm setting module includes a method for setting an alarm time, a method for setting alarm content and a method for repeating the alarm time. The method for setting alarm content specifies multiple pieces of alarm content as a category and a method supports searching the storage unit 150 or the alarm content server apparatus 200 for desired alarm content. The alarm triggering module includes a method for determining arrival of the alarm time, and a method for playing alarm content set in advance or alarm content selected from a preset category of alarm content upon arrival of the alarm time.

The alarm content 153 comprises a group of content items containing audio data stored in the storage unit 150 to support alarm setting and triggering operations. The alarm content 153 is classified into categories according to, for example, artist, album, release date and time, and media type such as moving or still image. The control unit 160 is configured to control signal flow and information collection and output operations used for realizing alarm operation.

Figure 3:
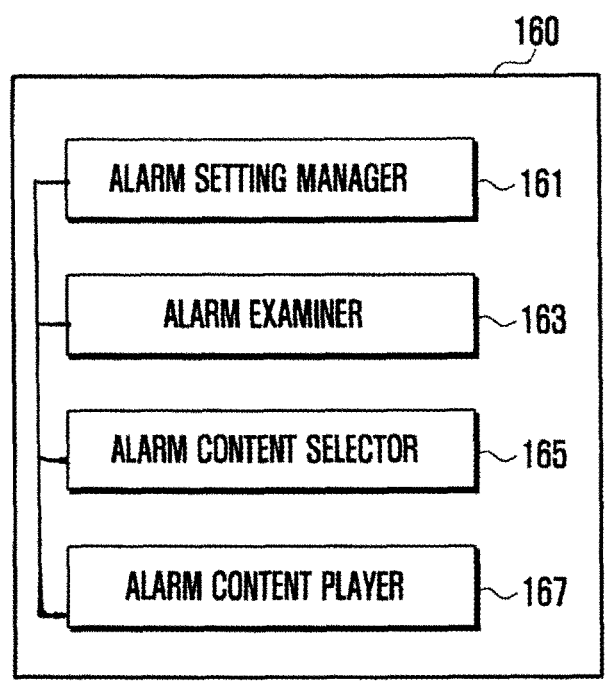
FIG. 3 shows a control unit in the mobile terminal of FIG. 2 according to invention principles.

FIG. 3 shows control unit 160 in the mobile terminal 100 of FIG. 2 and includes an alarm setting manager 161, an alarm examiner 163, an alarm content selector 165, and an alarm content player 167. The alarm setting manager 161 supports alarm setting operation and outputs an alarm icon on the display unit 140 or provides a separate shortcut key or virtual soft key. When an alarm icon is selected, the alarm setting manager 161 outputs an alarm setting providing an option for setting a category of multiple pieces of alarm content 153. The alarm setting manager 161 supports selection of a moving image as alarm content and provide an application link of a moving image playback application.

When desired alarm content is not present in the storage unit 150, the alarm setting manager 161 establishes communication with the alarm content server apparatus 200 through the communication network 300 and acquires and stores desired alarm content in the storage unit 150. The alarm setting manager 161 uses address information of the alarm content server apparatus 200 in alarm setting operation and establishing communication with server 200 for acquiring a group of multiple pieces of alarm content associated with a given category in response to a request message. In response to setting of an alarm, the alarm examiner 163 determines arrival of the alarm time by tracking the current time of the mobile terminal 100 and upon alarm time, the alarm examiner 163 notifies the alarm content selector 165 of alarm time arrival.

In response to receiving a notification of an alarm time arrival from the alarm examiner 163, the alarm content selector 165 examines alarm setting information and transfers alarm content set for the alarm to the alarm content player 167. When a category of alarm content is set, the alarm content selector 165 may select alarm content from multiple portions of alarm content in the category and transfers a selected alarm content item to the alarm content player 167. For example, the alarm content selector 165 selects alarm content from multiple portions of alarm content in the category at random or according to a predetermined particular order. For an alarm repeating on days or months, the alarm content selector 165 selects new alarm content from the category to avoid repetition of preceding alarm content.

When alarm content set for an alarm is not present in the storage unit 150, the alarm content selector 165 establishes communication with alarm content server apparatus 200 and acquires desired alarm content in real time. In the event that the network is unavailable, the alarm content selector 165 uses default alarm content or selects alarm content at random from the alarm content 153 stored in the storage unit 150 without accessing the alarm content server apparatus 200, in response to a predetermined alarm content priority. The alarm content player 167 is configured to play back the alarm content selected by the alarm content selector 165 and activates a music player or a moving image player, for example. In response to an input event prompting termination of an alarm, the alarm content player 167 discontinues alarm content playback.

Figure 4:
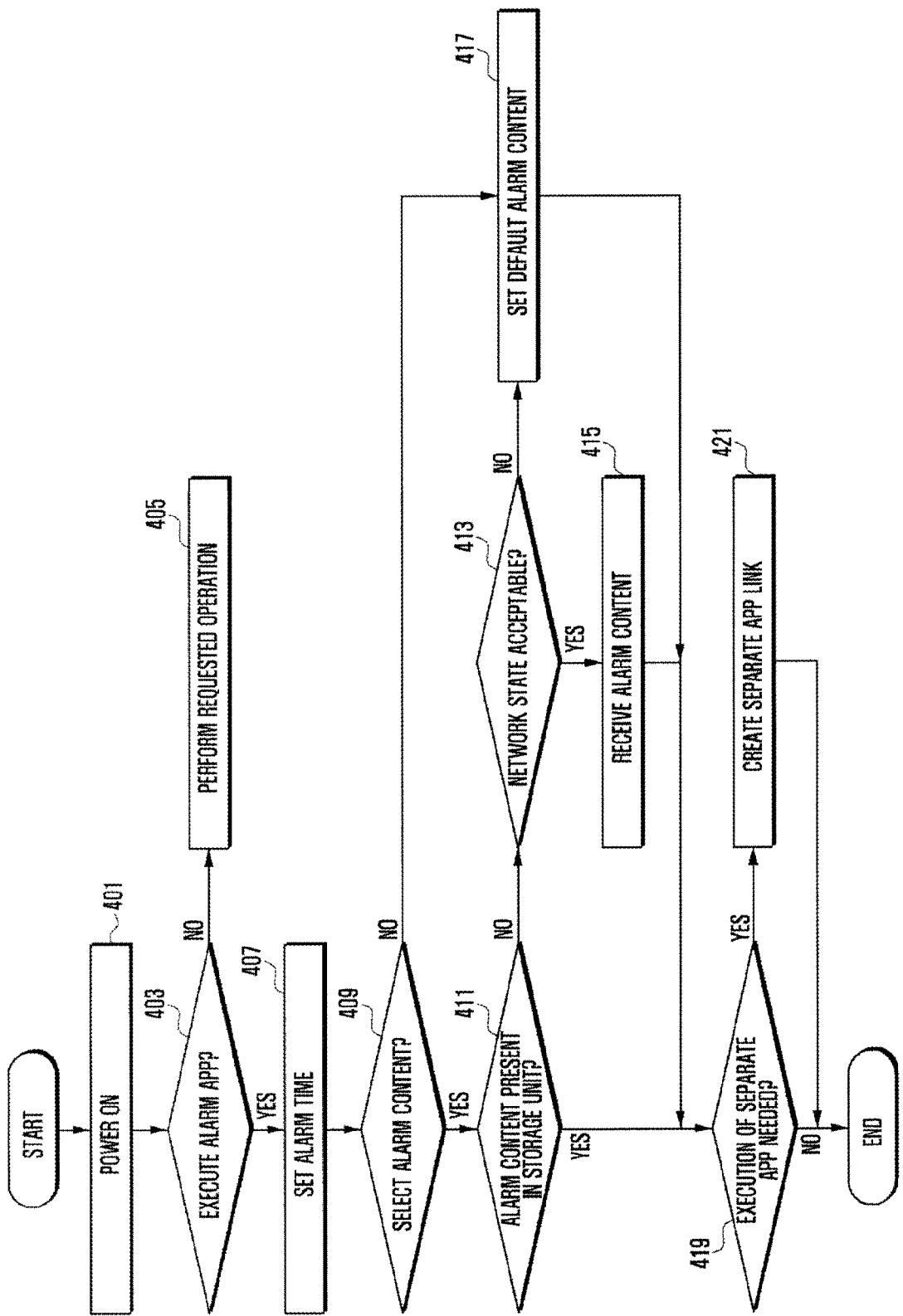
FIG. 4 shows a flowchart of an alarm setting process according to invention principles.

FIG. 4 shows a flowchart of an alarm setting process where the control unit 160 supplies power from a power source to the components of the mobile terminal 100 (step 401). In response to an input event being generated, the control unit 160 checks whether the input event is an execution request for an alarm application (step 403). When the input event is not an execution request for an alarm application, the control unit 160 performs a function corresponding to the input event (step 405). For example, the control unit 160 performs one of different functions supported by the mobile terminal 100, such as file playback, file editing, file transfer and call handling, in response to the input event. In response to the input event comprising an execution request for an alarm application, the control unit 160 initiates setting an alarm time (step 407). The control unit 160 outputs a screen image enabling alarm time setting via the display unit 140 and the user enters an alarm time value.

The control unit 160 determines whether an input event for alarm content selection is received (step 409) and if so, the control unit 160 determines whether alarm content indicated by the input event is present in the storage unit 150 (step 411). If the indicated alarm content is not present in the storage unit 150, the control unit 160 determines whether a network is available and operating acceptably (step 413). If the network is available, the control unit 160 acquires the indicated alarm content from the alarm content server apparatus 200 and stores the acquired alarm content in the storage unit 150 (step 415). If the network is unavailable, the control unit 160 selects a default alarm ringtone (step 417).

In response to the input event for alarm content selection indicating a category of multiple portions of alarm content, the control unit 160 selects alarm content at random or in sequence from multiple portion items of alarm content of the category. The control unit 160 may also select a popular song from the category as alarm content. When the input event for alarm content selection indicates a category of content, the control unit 160 establishes communication with the alarm content server apparatus 200, and for a category of content stored in the storage unit 150 or received from the alarm content server apparatus 200, examines rankings of items of content in the category, and selects the highest ranking content item from the category as alarm content. The control unit 160 restricts acquisition to content with the highest ranking as alarm content from among a category of content stored in the alarm content server apparatus 200. Alternatively, the control unit 160 acquires multiple portions of content of a particular category from the alarm content server apparatus 200 and stores the content portions in the storage unit 150. Control unit 160 examines the ranking information and selects a portion or item of content as alarm content from the stored multiple pieces of content of the particular category in response to the ranking information.

The control unit 160 determines whether to execute a separate application such as a moving image player to play the selected alarm content (step 419) and if so creates an application link for initiating the separate application capable of playing the selected alarm content (step 421). In response to alarm setting, the control unit 160 examines whether the alarm time has arrived by comparing the current time of the mobile terminal 100 with the alarm time. Locating alarm content and checking presence of indicated alarm content and selection of actual alarm content may be performed within the alarm triggering procedure and alarm time setting and designation of alarm content may be performed exclusively in the alarm setting procedure.

Figure 5:
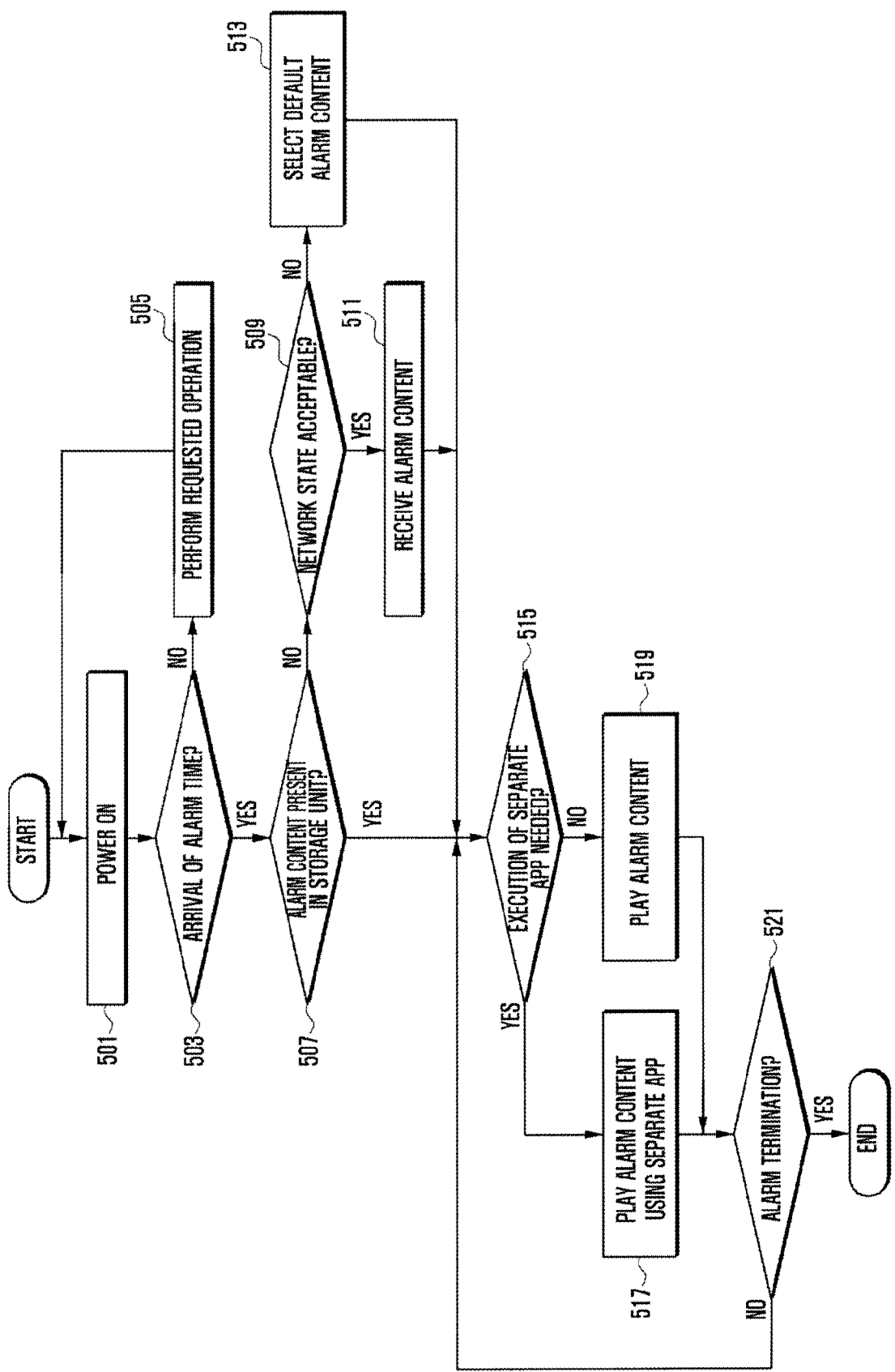
FIG. 5 shows a flowchart of an alarm triggering process according to invention principles.

FIG. 5 shows a flowchart of an alarm triggering process. Control unit 160 supplies power from a power source to the components of the mobile terminal 100 (step 501). The control unit 160 examines whether the alarm time has arrived (step 503) and if so, performs a requested operation (step 505) such as a user input operation or enters an idle state, for example. In response to determination of alarm time arrival, the control unit 160 examines alarm setting information and determines whether indicated alarm content is present in the storage unit 150 (step 507). If the indicated alarm content is not present in the storage unit 150, the control unit 160 determines whether the network is available for acceptable communication (step 509) and acquires the indicated alarm content from the alarm content server apparatus 200 (step 511). When it is determined the network is not available, the control unit 160 selects default alarm content (other than the indicated alarm content) from the storage unit 150 without access to the alarm content server apparatus 200 (step 513).

In response to the alarm setting information indicating a category of multiple items of alarm content, the control unit 160 selects alarm content at random, in sequence or according to prioritized ranking of the multiple items of alarm content of the category. The prioritized ranking is user determined, determined in response to a preset hierarchy of content subcategory, or determined based on alphabetical listing, time duration, or type of alarm (e.g. wake up, daily, weekly or monthly one time). In order to use ranking information, the control unit 160 connects to the alarm content server apparatus 200 and selects a content item with the highest ranking as alarm content from a category of multiple content items.

The control unit 160 checks whether execution of a separate application is necessary to play the selected alarm content (step 515) and if so, the control unit 160 executes the application to play the alarm content (step 517). If it is determined execution of a separate application is not necessary, the control unit 160 plays the alarm content (step 519). Control unit 160 checks whether an input event for alarm termination is received (step 521) and terminates the alarm triggering procedure. If an input event for alarm termination is not received, the control unit 160 returns to step 515 and continues the alarm triggering method.

Figure 6:
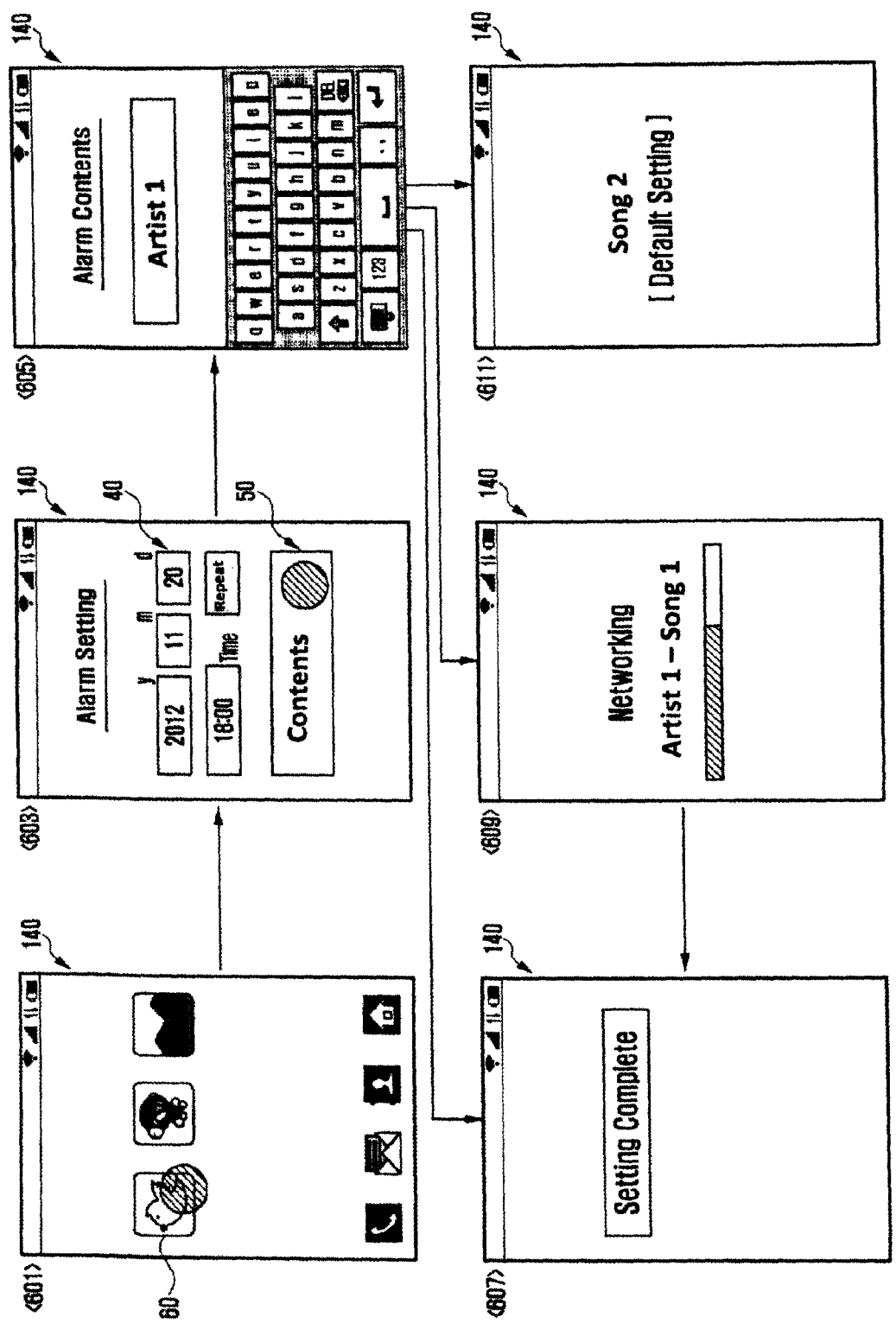
FIG. 6 shows screen representations illustrating an alarm setting operation according to invention principles.

FIG. 6 shows screen images presented on unit 100 display unit 140 illustrating an alarm setting operation. In response to being powered on, the mobile terminal 100 presents a preset screen 601 on the display unit 140. Alternatively, after presenting an idle screen, in response to an input signal the mobile terminal 100 presents a menu screen having icons as indicated by reference numeral including alarm icon 60 for alarm setting. In response to user input selecting the alarm icon 60 by touching, the mobile terminal 100 presents an alarm setting screen 603 on the display unit including a time region 40 for setting an alarm time and a content region 50 for setting alarm content. In response to user selection of the content region 50, the mobile terminal 100 outputs an alarm content selection screen 605. The user employs screen 605 to designate specific alarm content or a category of multiple items of alarm content. For example, the user may enter an artist name to designate an album containing multiple songs as a category. The mobile terminal 100 selects alarm content, at random, in sequence or according to the ranking of multiple items of content of the category. Setting a content category is advantageously used in providing successive alarms of different content but of the same category. An alarm content category is set for use in successive alarms, such as a wakeup alarm triggering each morning, that comprises content items newly selected from content items of a single category. In response to alarm time detection, the mobile terminal 100 automatically updates alarm setting information so that the alarm content indicator designates new content of the category.

When alarm content designated by the user is stored in the storage unit 150, the mobile terminal 100 indicates the stored alarm content is to be played when the alarm goes off and outputs a setting completion screen 607. When alarm content designated by the user is not stored in the storage unit 150, the mobile terminal 100 acquires the alarm content from server apparatus 200 as shown in screen 609. The mobile terminal 100 selects and acquires content items with the highest ranking as alarm content from content items of a particular category stored by server apparatus 200. When the network is unavailable for accessing the alarm content server apparatus 200, the mobile terminal 100 selects specific content items from the storage unit 150 as default alarm content as indicated in screen 611. A user is able to change the default alarm content selected in a network unavailable state by initiating return of mobile terminal 100 to a state associated with screen images 603 or 601.

In the above description, an artist name is used to indicate a category of content. However, the present invention is not limited thereto. For example, a content category may be indicated by the name of VOD content or the name of broadcast content produced by a broadcasting company such as SBS, YTN or KBS. When a broadcast program is composed of multiple episodes, the name of the broadcast program may be used to indicate a content category. For example, "Pororo" may be used to indicate a category of broadcast content for alarm setting.

Figure 7:
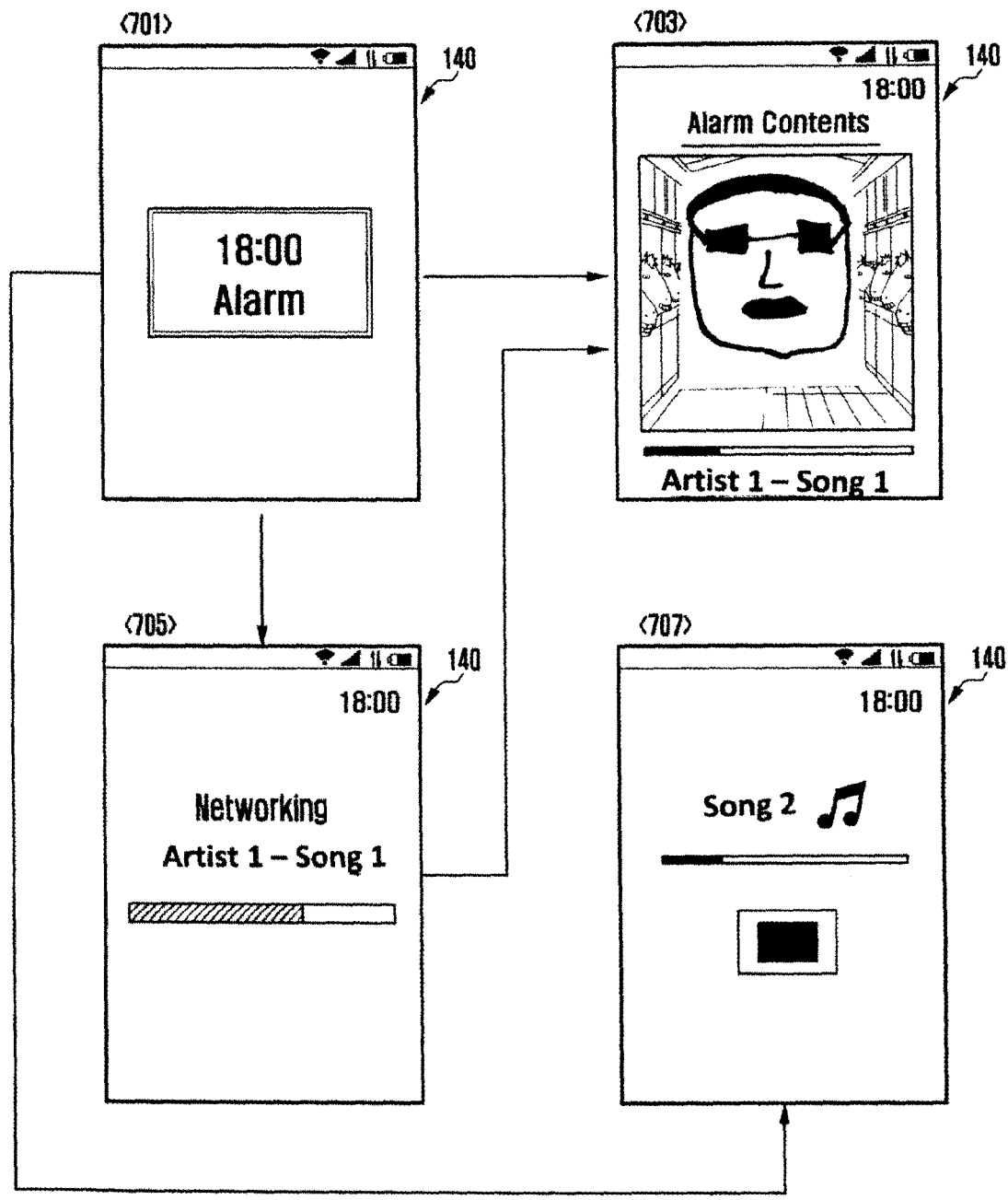
FIG. 7 shows screen representations illustrating an alarm triggering operation according to invention principles.

FIG. 7 shows screen representations illustrating an alarm triggering operation. In response to detection of an alarm time such as 18:00, the mobile terminal 100 outputs an alarm screen 701 on the display unit 140 and concurrently plays an alarm content item selected in the alarm setting procedure. When a set alarm content item is stored in the storage unit 150, the mobile terminal 100 plays the alarm content item as illustrated in screen image 703. Mobile terminal 100 executes a separate application such as a moving image player to play alarm content.

In response to absence of an alarm content item from the storage unit 150, the mobile terminal 100 downloads the alarm content item (e.g., in the background) from the alarm content server apparatus 200 through the communication unit 110 and as illustrated in screen image 705. The mobile terminal 100 acquires an alarm content item in a streaming mode and substantially immediately plays the alarm content item as illustrated in screen image 703. When the network is unavailable for acquiring alarm content from server apparatus 200, the mobile terminal 100 selects specific content items from the storage unit 150 as default alarm content and plays the default alarm content items as illustrated in screen image 707. If the network operation deteriorates while receiving alarm content in a streaming mode from the alarm content server apparatus 200, the mobile terminal 100 plays the default alarm content and disconnects network connection.

The system adaptively plays back alarm content set by the user in response to the location at which the alarm content is stored and enables a user to listen to different alarm content items when an alarm is triggered. The system enables a user to set a group of content items as alarm content to be played when an alarm goes off enabling the user to select a variety of content for alarm operation.

The mobile terminal may further include a local area communication module for local area communication, a data communication interface based on wired and wireless communication, an Internet communication module for Internet access, and a digital broadcast reception module for receiving and playing digital broadcasts. Although possible variations are too numerous to enumerate given the pace of digital convergence, it should be apparent to those skilled in the art that the mobile terminal may further include a unit comparable to the above-described units, and one unit of the terminal may be removed or replaced with another unit.

The mobile terminal of the present invention may be any information and communication appliance or multimedia appliance, such as a mobile communication terminal based on communication protocols supporting various communication systems, a portable multimedia player (PMP), a digital broadcast receiver, a personal digital assistant (PDA), a music player like an MP3 player, a portable game console, a smartphone, a laptop computer, or a handheld computer.

The above-described embodiments can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. The functions and process steps herein may be performed automatically or wholly or partially in response to user command. An activity (including a step) performed automatically is performed in response to executable instruction or device operation without user direct initiation of the activity. No claim element herein is to be construed under the provisions of 35 U.S.C. 112, sixth paragraph, unless the element is expressly recited using the phrase "means for."

Hereinabove, exemplary embodiments of the present invention have been described with reference to the accompanying drawings. Specific terms or words used in the description should be construed in accordance with the spirit of the present invention without limiting the subject matter thereof. It should be understood that many variations and modifications of the basic inventive concept described herein will still fall within the spirit and scope of the present invention as defined in the appended claims.

What is claimed is:

1. An alarm operation method for use by a mobile terminal, comprising:
 receiving input data used for setting an alarm;
 setting alarm content in a category of a musical artist's name entered by a user, the alarm content comprising multiple items of content by the musical artist; and
 selecting an alarm content item for playback from the items of content in response to detection of an alarm trigger condition;
 wherein setting alarm content comprises:
  determining whether content belonging to the category is present in a storage unit of the mobile terminal; and
  setting, if content belonging to the category is present in the storage unit, one item of content in the category as alarm content to be played in response to the alarm being triggered;
  if content belonging to the category is absent in the storage unit:
  establishing communication with an alarm content server providing content in response to a determination a network is available; and
  receiving multiple items of content belonging to the category from the alarm content server.

2. The alarm operation method of claim 1, further comprising selecting, after the alarm is triggered, new content other than previously played alarm content from the items of content as alarm content to be played next.

3. The alarm operation method of claim 1, wherein setting alarm content further comprises:
 selecting one item of content from a plurality of content items stored in the storage unit as default alarm content to be played when the alarm is triggered in response to a determination a network is unavailable.

4. An alarm operation method for use by a mobile terminal, comprising:
 receiving input data used for setting an alarm;
 setting alarm content comprising at least one of,
  (a) audio data and (b) video data, to be played in response to detection of an alarm trigger condition, the alarm content comprising a category of multiple items of content; and selecting an alarm content item for playback from the category in response to the detection of the alarm trigger condition;

wherein setting alarm content comprises:

entering a name of the category, determining whether content belonging to the category is present in a storage unit of the mobile terminal, and setting, when content belonging to the category is present in the storage unit, one item of content in the category as alarm content to be played in response to the alarm being triggered;

when content belonging to the category is absent from the storage unit:

establishing communication with an alarm content server providing content in response to a determination that a network is available; and selecting content items provided by the alarm content server that have a highest ranking according to predetermined selection criteria from a plurality of content items that belong to the category and have associated rankings, and storing the content items as alarm content for use in generating an alarm.

5. An alarm operation method for use by a mobile terminal, comprising:

examining alarm setting information in response to the detection of an alarm trigger time;

selecting one item of content as alarm content from multiple items of content belonging to a category of a plurality of items of content, the category being set for use in generating an alarm, the alarm content comprising at least one of, (a) audio data and (b) video data, to be played in response to detection of an alarm trigger condition; and playing the selected alarm content item in response to the detection of the alarm trigger time;

wherein selecting one item of content as alarm content comprises:

selecting an item of content with the highest ranking according to predetermined selection criteria from a plurality of items of content belonging to the category after examining ranking information associated with the category.

6. The alarm operation method of claim 5, further comprising executing a separate application to play the alarm content item and outputting audio and video data produced from application execution.

7. The alarm operation method of claim 6, further comprising:

establishing communication with an alarm content server through a communication unit; and acquiring ranking information for multiple items of content belonging to the category from the alarm content server.

8. The alarm operation method of claim 6, wherein selecting one item of content as alarm content further comprises at least one of:

determining whether content belonging to the category is present in a storage unit of the mobile terminal, and if present, selecting one item of content in the category as alarm content to be played in response to the alarm being triggered;

examining network availability in response to a determination content belonging to the category is absent from the storage unit, establishing communication via the network with an alarm content server in response the network being available and acquiring one item of content from among a plurality of items of content belonging to the category stored in the alarm content server; and in response to the network being unavailable, selecting one item of content as default alarm content from content stored in the storage unit.

9. The alarm operation method of claim 6, further comprising selecting, after the alarm is triggered, new content different than previously played alarm content from the category as alarm content to be played next.

10. A mobile terminal supporting alarm operation, comprising:

at least one of a display unit and an audio processing unit to output alarm content played when an alarm is triggered; and a control unit for, determining whether desired alarm generation content is present in a storage unit, in response to a determination that the desired alarm generation content is present in the storage unit, selecting content from the storage unit as alarm content to be played when an alarm is triggered, in response to a determination that the desired alarm generation content is absent from the storage unit, determining network operational availability, establishing via the network, communication with an alarm content server providing content, in response to the determined network operational availability, and acquiring desired alarm generation content from the alarm content server, and in response to a determination the network is operationally unavailable, selecting one item of content as default alarm content from content stored in the storage unit;

wherein the control unit selects one item of content as alarm content from multiple items of content belonging to a predetermined category, by acquiring ranking information for multiple items of content belonging to the category and selecting an item of content with the highest ranking according to predetermined item selection criteria from the category, and plays the selected item of content as alarm content.

11. The mobile terminal of claim 10, wherein, when the alarm is successively and repetitively generated, the control unit plays a different item of content selected from the category as alarm content in response to the alarm being triggered.

* * * * *